United States Patent [19]
Storch

[11] Patent Number: 6,098,898
[45] Date of Patent: Aug. 8, 2000

[54] MASTER CONTROL SYSTEM FOR CONSERVING WATER BY SPRINKLER SYSTEMS WITHIN A GEOGRAPHICAL REGION

[76] Inventor: Paul Storch, 14 Bond St., #259, Great Neck, N.Y. 11021

[21] Appl. No.: 09/286,101

[22] Filed: Apr. 2, 1999

[51] Int. Cl.$^7$ .................................................. A01G 27/00
[52] U.S. Cl. ............................ 239/69; 239/70; 137/624.2; 364/145
[58] Field of Search .................................. 239/63, 64, 66, 239/67, 69, 70, 71, DIG. 15; 137/624.2; 251/129.04; 364/145, 146

[56] References Cited

U.S. PATENT DOCUMENTS

| | | | |
|---|---|---|---|
| 4,146,049 | 3/1979 | Kruse et al. | 239/71 |
| 4,165,532 | 8/1979 | Kendall et al. | 137/624.2 |
| 4,209,131 | 6/1980 | Barash et al. | 239/69 |
| 4,396,149 | 8/1983 | Hirsch | 239/63 |
| 4,431,338 | 2/1984 | Hornabrook . | |
| 4,545,396 | 10/1985 | Miller et al. | 239/69 |
| 4,548,225 | 10/1985 | Busalacchi | 239/69 |
| 4,626,984 | 12/1986 | Unruh et al. | 239/69 |
| 4,646,224 | 2/1987 | Ransburg et al. | 239/63 |
| 4,838,310 | 6/1989 | Scott et al. | 137/624.2 |
| 4,962,522 | 10/1990 | Marian . | |
| 5,293,554 | 3/1994 | Nicholson | 137/624.2 |
| 5,333,785 | 8/1994 | Dodds et al. | 239/69 |
| 5,813,606 | 9/1998 | Ziff | 239/67 |

*Primary Examiner*—Andres Kashnikow
*Assistant Examiner*—Lisa Ann Douglas
*Attorney, Agent, or Firm*—Lackenbach Siegel Marzullo Aronson & Greenspan, P.C.

[57] ABSTRACT

A master control system for conserving water used by sprinkler systems within a predetermined geographical region includes a plurality of sprinkler systems each of which is assigned an identifying indicia. A transmitting station is arranged for transmitting control signals receivable at any location within the geographical region. A valve connects each sprinkler system to a water source for selectively feeding water to an associated sprinkler system when the valve is open and for precluding water from being fed to the associated sprinkler system when the valve is closed. A receiver is provided for each sprinkler system within the region connected to an associated valve for receiving the control signals and generating a disabling signal for causing only said valves for the sprinkler systems assigned said identifying indicia to open independently of their status. In this manner, said transmitting station can control and override the operation of selected sprinkler systems assigned said identifying indicia to regulate the extent to which water may be used within said geographical region in accordance with protocols established for the consumption of water by such sprinkler systems within said geographical region.

20 Claims, 4 Drawing Sheets

MASTER CONTROL SYSTEM FOR CONSERVING WATER BY SPRINKLER SYSTEMS WITHIN A GEOGRAPHICAL REGION

BACKGROUND OF THE INVENTION

1. Field of the Invention

The present invention generally relates to a water conservation apparatus and, more particularly, to a master control system for conserving water by sprinkler systems within a geographical region.

2. Description of the Prior Art

Fresh water is an increasingly valuable commodity. Indeed, many regions in short supply of fresh water are required to purchase and import water much as any other required commodity. Municipalities, as well as entire counties and states, have taken and continue to take drastic steps in order to conserve water. Regulations to conserve water have been enacted to affect industrial, commercial and residential users. Examples include enacting prohibitions against the use of water for non-essential purposes such as filling of swimming pools. Fairly common ordinances by many municipalities or other governmental subdivisions regulate the use of residential sprinkler systems in some fashion. Commonly, residents can only use their sprinkler systems on certain days (e.g., odd or even). Large commercial users of water, such as car washes, have been required to recycle the water that they use. Such regulatory schemes are helpful but not totally effective. Some residential users simply ignore the regulations. Others conceal their use by sprinkling their lawns, for example, at night when such use is more difficult to detect. Also, such regulatory schemes tend to implement simple rules (e.g., odd-even) that do not provide the flexibility or versatility to provide a greater degree of control by which the numbers of users dispensing water at any given time can be easily controlled.

In U.S. Pat. No. 4,209,131, a computer-controlled irrigation system is disclosed for automatically irrigating an agricultural area having a plurality of crop-growing fields. The system includes a central station and a number of remote stations located in the fields. A computer is programmed to define a predetermined schedule for delivery of pre-established quantities of water to each field. The delivery of water can be made dependent on environmental conditions such as wind, speed, temperature, humidity or other factors. The system interrogates the remote stations for flow meter, water pressure meter, environment conditions and alarm information, to diagnose proper operation and to monitor the delivery of water. The system, therefore, is arranged to meter appropriate amounts of water to irrigate fields to ensure that the crops are provided with appropriate amounts of water.

In U.S. Pat. No. 5,813,606, a radio controlled sprinker system is disclosed for use with a residential sprinkler system that is provided with a transmitter unit that includes at least one moisture sensor. The moisture sensor monitors the moisture in the ground and generates a signal representative of the moisture level in the ground. Activation signals are transmitted on the receipt of a moisture signal which indicates that the moisture level is below a desired amount in the region of the transmitter. Therefore, the local transmitters effectively enable the sprinkler systems only when the ground conditions call for additional water.

In U.S. Pat. No. 4,838,310, a remotely controlled irrigation system is disclosed used in conjunction with golf course, business parks and along state highways to irrigate plants in various remote areas that are difficult to manually control. The patent is primarily concerned with providing power at the remote locations for operating a receiver that can be actuated by a central transmitter. This is achieved by providing a turbine or impeller in the path of the pipe feeding the sprinkler system which rotates when fluid moves through the pipe to operate a generator which charges a local battery.

In U.S. Pat. No. 4,626,984, a remote computer control for irrigation systems is disclosed for controlling a number of different irrigation systems. Each individual system has its local controller for controlling an individual system. The patent is primarily concerned with the central computer which would normally shut down the entire system. The patent discloses the use of intelligent remote units that can process and execute stored programs. By distributing intelligence among the remote units, the system becomes less dependent on the operation of the central computer. Should the central computer fail, each intelligent remote station will continue to operate its associate irrigation system in accordance with instructions stored therein.

An irrigation control system is disclosed in U.S. Pat. No. 4,396,149, which has as one of its objectives the conservation of water and energy by providing optional or highly efficient irrigation to growing plants. Soil moisture sensors transmit data which is used to regulate the operation of the irrigation system and to provide water on a need basis.

Therefore, while the technologies have been available, municipalities and other local and regional water authorities have not utilized such technologies in a combination with a plurality of individual residential sprinkler systems for selectively disabling such sprinkler systems. While the prior art has been primarily concerned with enabling water dispensing systems on a need basis, such systems have not been provided the means for overriding independently operated sprinkler systems in order to disable them and selectively prevent water from being discharged through such systems.

SUMMARY OF THE INVENTION

Accordingly, it is an object of the present invention to provide a master control sprinkler system for conserving water by systems within a geographical region.

It is another object of the present invention to provide a master control system as in the previous object which is simple in construction and economical to use.

It is still another object of the present invention to provide a master control system as in the previous object which can effectively restrict the use of sprinkler systems.

It is a further object of the present invention to provide a master control system which can be used by municipalities, counties, states of different sizes with equal effectiveness.

It is still a further object of the present invention to provide a master control system of the type under discussion which can be used by adjoining municipalities or other regions without interfering with each other.

It is still a further object of the present invention to provide a master control system as in the previous objects which can be conveniently programmed to modify the regulatory schemes within the geographical region being controlled.

In order to achieve the above objects, as well as others which will become apparent hereafter, a master control system for conserving water used by sprinkler systems within a predetermined geographical region comprises a plurality of sprinkler systems each of which is assigned an identifying indicia. A transmitting station is provided and arranged for transmitting control signals receivable at any and all location(s) within the geographical region. A valve connects each sprinkler system to a water source for selectively feeding water to an associated sprinkler system when the valve is open (in an "enabled" condition) and for precluding water from being fed to the associated sprinkler system when the valve is closed (in a "disabled" condition). A receiver is provided for each sprinkler system within the region connected to an associated valve for receiving the control signals and generating a disabling signal for causing only said valve(s) for said sprinkler system(s) which have been assigned said identifying indicia to open independently of the status of the valve. In this matter, said transmitting station can control and override the operation of selected sprinkler systems assigned with said identifying indicia to regulate the extent to which water may be used within said geographical region in accordance with protocols established for the consumption of water by said sprinkler systems within said geographical region. Such protocols may include disabling all of the sprinkler systems within a region, half of the sprinkler systems (e.g., associated with odd numbered or even numbered residence addresses) or any other desired manner of regulation.

BRIEF DESCRIPTION OF THE DRAWINGS

These and other objects, features and characteristics of the present invention will be more fully apparent, understood and appreciated from the ensuing detailed description, when read with reference to the various figures of the accompanying drawings, wherein.

DESCRIPTION OF PREFERRED EMBODIMENTS

Figure 1:
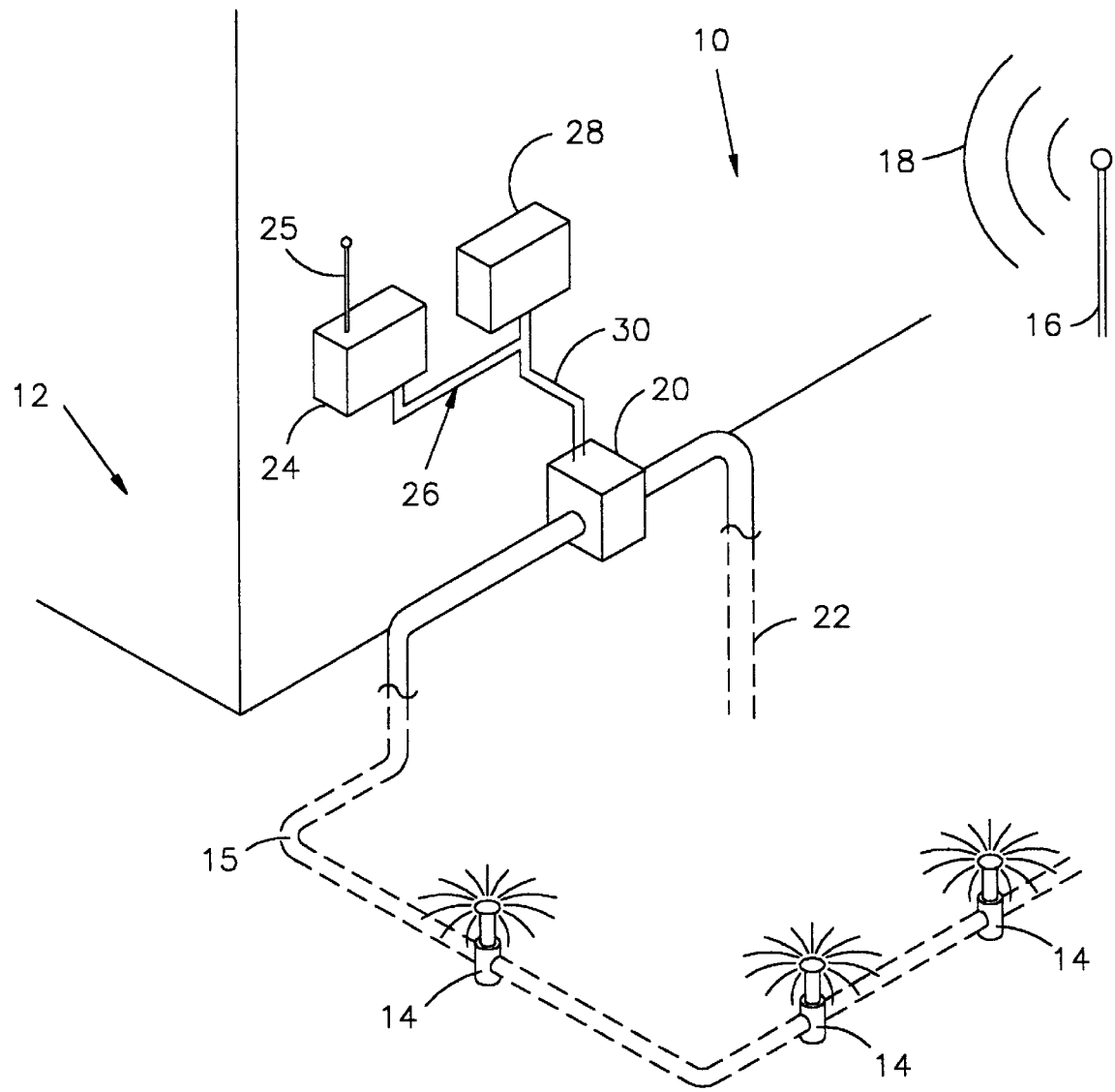
FIG. 1 is a schematic representation of a sprinkler system adapted to be used with the present invention, also diagrammatical illustrating a transmitting antenna of a master control system in accordance with the present invention.

Referring now specifically to the Figures, in which identical or similar parts are designated by the same reference numerals throughout, and first referring to FIG. 1, a master control system for conserving water dispensed by sprinkler systems within a predetermined geographical region, in accordance with the present invention, is generally designated by the reference numeral 10.

The master control system 10 may be used to regulate a single sprinkler system 12 within an associated geographical region or, more typically, a plurality of such similar or equivalent sprinkler systems. The sprinkler system 12, standing alone, is similar to known and conventional sprinkler systems that consist of a plurality of sprinkler units 14 connected in some fashion to a distribution conduit or conduits 15.

The manner in which the otherwise conventional sprinkler system 12 differs from conventional sprinkler systems, both residential and commercial sprinkler systems, is the provision of means, represented by transmitting antenna 16 in FIG. 1, for transmitting control signals 18, to be more fully discussed below, for controlling, regulating or, more accurately, limiting the use of the sprinkler system 12 under specified circumstances or conditions. As with conventional systems, the conduit or conduits 15 are connected, by means of a control valve 20, to a water source 22 connected to the water mains of the municipality, township, etc., in which the residence is situated.

An important feature of the present invention is that each sprinkler system 12 is assigned an identifying indicia, which may be unique to the specific sprinkler system 12 or may be common to a group of such similar sprinkler systems within the region. The nature of the identifying indicia is not, in and of itself, critical for purposes of the present invention and any identifying indicia, coded in any suitable manner, may be used for this purpose. It is also important, for the present invention, that the transmitter be so situated that it be capable of transmitting control signals 18 throughout the designated region so that such control signals are receivable by all sprinkler systems located at any location within the geographical region.

The valve 20 may be a conventional electrically activated or regulated water valve for selectively feeding water to an associated sprinkler system when the valve is open and for precluding water from being fed to the associated sprinkler system when the valve is closed.

In order to practice the invention, there is provided a receiver 24 for each sprinkler system, within the region, connected to an associated valve 20 for receiving the control signals 18 and generating a disabling signal only for the valves of the sprinkler systems assigned specified identifying indicia to open the valves independently of their open or closed status. In this manner, the transmitting station can control and override the operation of selected sprinkler systems assigned with the specified identifying indicia to regulate the extent to which water may be used within the geographical region in accordance with the protocols established for the consumption of water by such sprinkler systems within the geographical region.

It is possible that all the sprinkler systems within a given region are each assigned the same identifying indicia. In this event, transmission of a single control signal 18 can cause disabling signals to be applied to each of the sprinkler systems within a region assigned a common identifying indicia, so that the transmitting station can selectively simultaneously enable all the sprinkler systems to operate or disable them to prevent water from being dispensed from the water source. However, it is contemplated that, more typically, the plurality of sprinkler systems within the region are arranged into "n" groups, each of which is assigned a unique identifying indicia. The transmitting station selectively transmits "n" control signals each only being effective for generating a disabling signal for only one associated group of sprinkler systems. In this manner, the transmitting station can control the use or distribution of water by selectively disabling at least one of the groups of sprinkler systems at any given time. It is possible, for example, for n=1 or n=2. However, "n" can be equal to any other desired quantity. In practice, each of the sprinkler systems is associated with an even or odd numbered address within a region, the control signals transmitted for group n=1 are transmitted to disable sprinkler systems associated with the even numbered addresses, while control signals addressing group n=2 are transmitted to disable the sprinkler systems associated with the odd numbered addresses.

The number of sprinkler units 14 associated with each sprinkler system is not critical and, as indicated, the layout, configuration and specifics with regard to the layouts and constructions of the sprinkler systems are not, per se, new and do not form part of the invention. In this connection, it is also pointed out that separate control valves 20 may be used for each sprinkler unit 14, although, clearly, it is more cost effective to utilize a single control valve 20 to operate a plurality of series or parallel connected sprinkler units 14. Therefore, while a single residence may utilize more than one control valve 20, it is envisioned that all of the identifying indicia for each of the valves for a given residence will be the same so that all of the valves will be simultaneously closed or disabled. As suggested, however, it is also possible to provide different identifying indicia to different valves associated with the same residential address so that some of these may be selectively opened or enabled while the others are closed or disabled.

It is important, as will become evident, that each transmitting station be capable of transmitting to each location within the geographical region so that all sprinkler systems within that geographical region can be activated or disabled. The specific shape or political subdivision representing the geographical region is not critical and such geographical regions may comprise or represent a water district municipality, a county, a state, etc. ("water authority").

Figure 2:
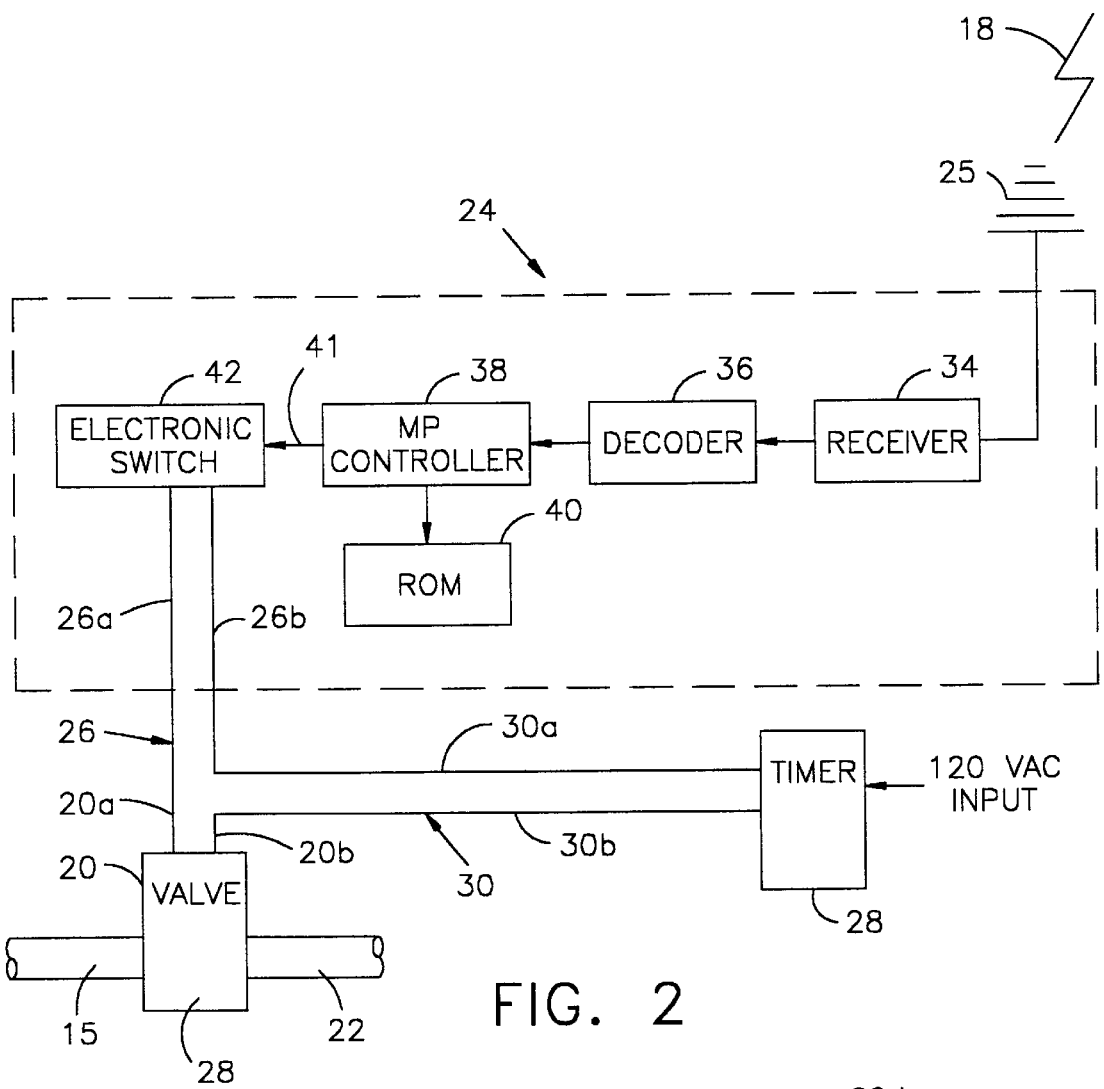
FIG. 2 is a block diagram illustrating one arrangement of the components of a receiver used in conjunction with a single sprinkler system of the type shown in FIG. 1, illustrating how the receiver is connected to the sprinkler system to regulate the same.

Referring to FIGS. 1 and 2, the component integrated within each sprinkler system in order to practice the present invention is a receiver 24 that includes a receiving antenna 25 that forms an input into the receiver 24. The receiving station 24 includes a receiver 34 which typically amplifies and, where required, demodulates the control signal 18 received by the receiving antenna 25. Where the control signals are digital, a decoder 36 may be used to decode the received control signal 18 and transform that signal into a format that can be readily fed or inputted into a microprocessor controller 38. The microprocessor controller 38 generates, at its output, disabling signals at 41. The disabling signals at 41 may be in any suitable form such as a direct voltage needed to operate an electronic switch 42 that may be in the form of a single or multiple pole relay. The contacts of the switch are connected across the leads 26a, 26b, effectively being placed in series with the lead 30a connected to the timer 28. The other lead, 30b, from the timer 28 is connected directly to the valve 20. The timer 28 can be any conventional timer of the type typically used to operate sprinkler systems that is programmed to apply a voltage to the valve 20 at desired times. By setting the timer, a user can specify the times during the day and the days during the week that the sprinkler is to be automatically operated. During such times, the timer applies a voltage, by means of the leads 30a, 30b to actuate the solenoid valve 20. When a voltage is applied to the valve, the valve is opened and the water is permitted to flow from the water source 22 to the conduit or conduits 15. As soon as the voltage is removed, the valve closes and the flow of water is interrupted. In accordance with the present invention, an additional electronic switch 42 is interposed between the timer 28 and the valve 20. It will be clear that when the electronic switch 42 is open, it will prevent a voltage generated by the timer 28 from being applied to the valve 20 under any circumstances, even when the timer 20 is programmed to apply a voltage to the valve. As such, the electronic switch 42, forming part of the receiver 24, serves as a master control for the sprinkler system 12 which is beyond the ability of the owner of the sprinkler system to modify or change. While the receiver 24 cannot turn on the sprinkler system, under all conditions of the timer 28, it can always disable the sprinkler system 12 irrespective of the condition of the timer. By having the exclusive ability to control the receivers 24 and, therefore, the electronic switches 42, a municipality or other regional political subdivision can prevent excessive or wasteful uses of water in connection with sprinkler systems during period of drought or water shortage or permit adequate, but not excessive, watering during periods of normal water levels to prevent future shortages. If desired, a sensor may be provided (not shown) to monitor a short placed across the electronic switch 42, across the lines 26a, 26b, to prevent the timer from generating an actuating voltage when such a short is detected. Such sensor and associated control circuit could be used to avoid bypassing the receiver by one tampering with the system. Also, or alternatively, the timer 28 and the receiver 24 can be housed in a tamper proof housing so that the leads emanating from the electronic switch 42 because inaccessible and therefore cannot be shorted.

Figure 2A:
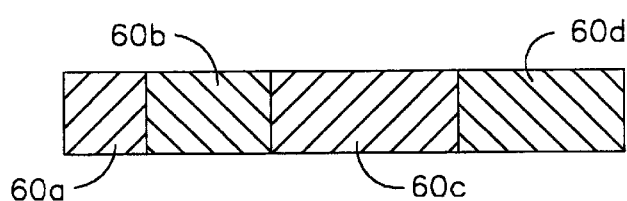
FIG. 2A is a schematic representation of an exemplary instruction code format that can be used for controlling the sprinkler system shown in FIGS. 1 and 2.
Figure 3:
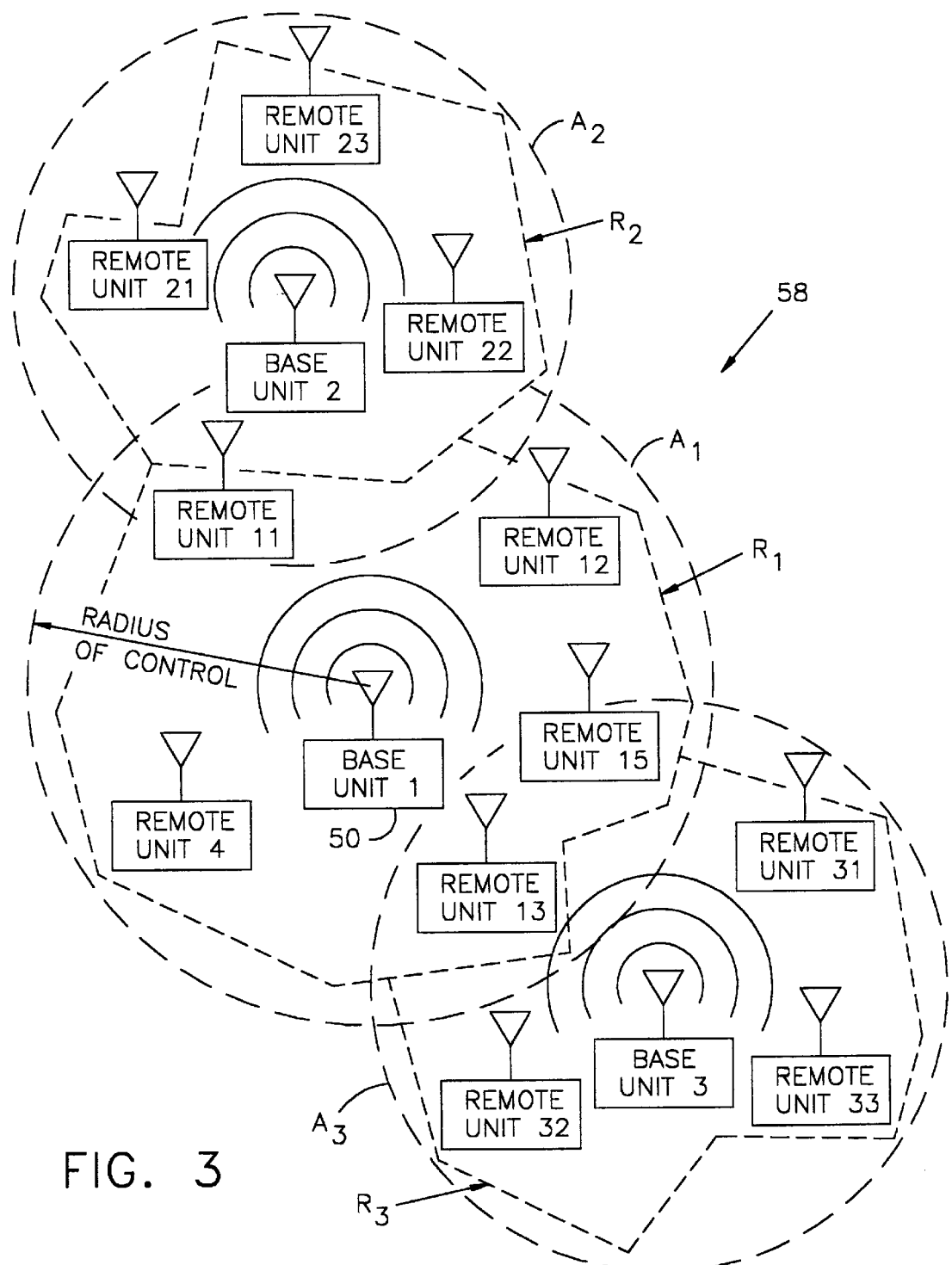
FIG. 3 illustrates a grid of master control systems in accordance with the present invention each for regulating a plurality of sprinkler systems within associated geographical regions and each controlled by their own separate and independent transmitting station for regulating the individual sprinkler systems within their respective regions.

Referring to FIG. 3, three adjoining geographical regions R1, R2 and R3 are illustrated in dash outline. Each of these regions can, and usually does, have a different configuration and/or size. The geographical regions R1–R3 may be adjoining municipalities, towns, counties or even states. A base transmitting unit 1 is shown generally centrally positioned within the region R1. Similarly, base transmitting units 2 and 3 are generally centrally positioned within the regions in R2 and R3. Each of the transmitting base units have the ability to transmit control signals as aforementioned in order to be received at any location within the geographical region in which the base station is located. Where the transmitting stations use omnidirectional antennas, the areas of coverage A1–A3 are generally circular, with the base transmitting stations at the centers of each of the areas. It will be clear that each base transmitting station needs to be positioned and have sufficient transmitting power to ensure that each of the areas A1–A3 totally circumscribe or enclose the associated geographical regions R1–R3, respectively. Because the geographical regions are irregular, there results the possible that the area of coverage of one of the base transmitting stations also encloses remote units physically located within another geographical region. Thus, for example, remote unit 11 located in geographical region R1 is within both areas of coverage A1 and A2 and thereby capable of receiving control signals from both base transmitting units 1 and 2. Similarly, remote units 13 and 15, physically located with geographical region R1, can receive control signals both from transmitting base units 1 and 3. However, since each remote unit, representing a residence and/or business, needs to be controlled only by the transmitting base unit within its own geographical region, it is clear that each of the receivers and transmitting base units or stations need to be set up to utilize discriminating signals each specific to its own geographical region. For example, referring to FIG. 2A, a sample data stream is illustrated, depicting different segments of information that may be transmitted within each of the region. For example, information representing the region can be transmitted first to specify the units to be controlled within a given region, while excluding the remote units in other regions. Additionally, authentication information 60b, in the form of a suitable code, can next be transmitted to authenticate the transmitted signal as a valid signal transmitted by a duly authorized authority. Next, identifying indicia 60c can be transmitted, identifying the residence or groups of residences, and more specifically their sprinkler systems, that need to be accessed or controlled by the data stream. Finally, information 60d is transmitted that regulates the sprinkler system by instructing an associated valve to open or close. In the example shown, the enable/disable information 60d is used to open or close the electronic switch 42. It is clear that the specific nature and format of the data stream is not critical for purposes of the present invention. Thus, the specific arrangement of the information within the data stream may be modified. Also, some or all of the information in the data stream may be analog and/or digital. Under such a scheme, transmission of a control signal by the base unit 2 would have no effect on the remote unit 11, even if the identifying indicia were to be the same because either the regional code or the authentication code would be different. Such information, stored in a ROM 40 (FIG. 2) of the remote unit 11, would not allow the associated sprinkler system to react to any signal transmitted by the base unit 2.

It will be clear, therefore, that when the control signals 18 are coded, the receiver must include an appropriate decoder 36 for decoding the control signals and for generating the disabling signals in the input to the electronic switch 42.

The decoder may be followed by a microprocessor 38 for receiving the decoded information and processing such information, using the stored identifying indicia and possibly verification information within the ROM 40 to perform the necessary comparisons or validation checks and generating a disabling signal, in the form of a direct voltage suitable for actuating the electronic switch 42. Therefore, the decoder 36 can convert the control signal, in the form that it is transmitted, to suitable binary or digital information that can be processed by a microprocessor 38. The processor, in turns, uses this information to determine whether a disabling signal is to be generated under any specific set of circumstances. The ROM 40 serves as a storage means for storing information identifying each sprinkler system as well as any other information identifying the sprinkler system as being within a specified geographical region or other validation information, for example, to identify a specific transmitter within a given geographical region, where more than one such transmitter is utilized within the same region.

Figure 4:
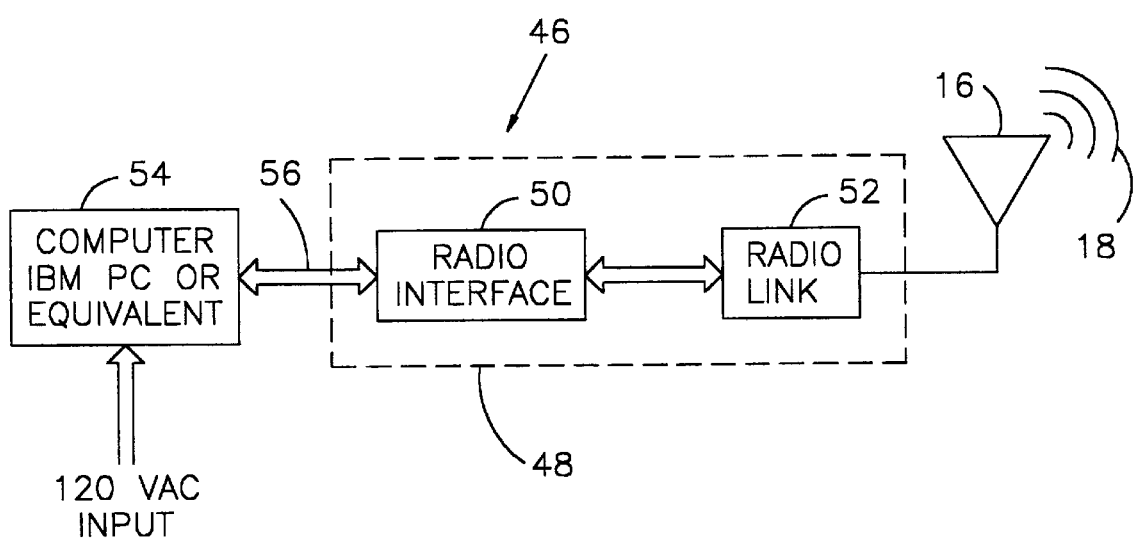
FIG. 4 is a block diagram illustrating one arrangement of components forming the master control station from which control signals are transmitted to regulate the individual sprinkler systems within the region.

Referring to FIG. 4, a simplified block diagram is illustrated for depicting the elements or components at each transmitting station. A computer 54 is programmed to generate information data streams similar to that depicted in FIG. 2A Thus, the computer 54 is programmed in a manner consistent with the protocol established within the geographical region, e.g., municipality or township or county, for the consumption of water by sprinkler systems within the geographical region. If, for example, all the sprinklers are to be simultaneously disabled, the computer 54 is programmed to include all of the identifying indicia for all the sprinkler systems within a region. On the other hand, if only sprinkler systems associated with even numbered addresses are to be disabled on one day and the sprinkler systems associated with odd numbered addresses are to be disabled on an alternate day, the computer 54 can likewise be programmed to issue appropriate control signals to accomplish those desired results. Where more complex schemes are to be implemented, the computer 54 can likewise be programmed accordingly. It will be appreciated that schemes as simple or as complicated as desired may be easily implemented by simply programming the computer 54 in accordance with known programming techniques.

Once programmed, the computer 54 has its output data line 56 connected to the input of a radio transmitter 46. The data flow 56 is inputted into a radio interface 50 which transforms the digital signal to a signal appropriate for transmission over the radio waves. The output of the radio interface 50 is fed to a radio link 52 which, in turn, feeds the transmitting antenna 16. The technology needed to transmit the control signals at the transmitting units and the receivers for receiving the control signals is well known. See, for example, U.S. Pat. Nos. 4,146,049; 4,209,131; 4,396,149; 4,626,984; 4,838,310; and 5,813,606.

It will be clear that with the present invention, municipalities and other governmental subdivisions can effectively control or regulate the use or consumption of water, a valuable resource, in accordance with desired protocols. This will prevent the intentional or unintentional waste of a valuable commodity, particularly during times of drought or water shortages. The system is simple and inexpensive to implement and can be readily retrofitted to existing sprinkler systems, as well as used in connection with newly installed sprinkler systems.

Although the present invention has been described in relation to particular embodiments thereof, many other variations, modifications and other uses will become apparent to those skilled in the art. It is the intention, therefore, that the present invention not be limited by the specific disclosure of the embodiments therein, but only by the scope of the appended claims.

What I claim:

1. Master control system for conserving water used by sprinkler systems within a predetermined geographical region, comprising a plurality of sprinkler systems, each of which is assigned an identifying indicia; a transmitting station arranged for transmitting control signals receivable at any and all location(s) within said geographical region; a valve connecting each sprinkler system to a water source for selectively feeding water to an associated sprinkler system when said valve is open and for precluding water from being fed to said associated sprinkler system when said valve is closed; a receiver for each sprinkler system within said region connected to an associated valve for receiving said control signals and generating a disabling signal for causing only said valve(s) for said sprinkler system(s) assigned said identifying indicia to open independently of their status, whereby said transmitting station can control and override the operation of selected sprinkler systems assigned said identifying indicia to regulate the extent to which water may be used within said geographical region in accordance with protocols established for the consumption of water by said sprinkler systems within said geographical region.

2. Master control system as defined in claim 1, wherein said plurality of sprinkler systems are each assigned the same identifying indicia, whereby transmission of said control signal causes disabling signals to be applied to each of said sprinkler systems within said region, whereby said transmitting station can selectively enable all said sprinkler systems to operate or disable all said sprinkler systems from dispensing water from the water source.

3. Master control system as defined in claim 1, wherein said plurality of sprinkler systems are arranged into n groups each of which is assigned a unique identification indicia, said transmitting station selectively transmitting n control signals each only effective for generating a disabling signal for only one associated group of sprinkler systems, whereby said transmitting station can control the use or distribution of water by selectively disabling at least one of said groups of sprinkler systems at any given time.

4. Master control system as defined in claim 3, wherein n=1.

5. Master control system as defined in claim 3, wherein n=2.

6. Master control system as defined in claim 5, wherein each sprinkler system is associated with an even or odd numbered address within said geographical zone, and wherein said n=1 control signals are transmitted to disable the sprinkler systems associated with the even numbered addresses and wherein the n=2 control signals are transmitted to disable the sprinkler systems associated with the odd numbered addresses.

7. Master control system as defined in claim 1, wherein each sprinkler system comprises a plurality of sprinkler units controlled by a common valve.

8. Master control system as defined in claim 1, wherein said geographical region comprises a municipality.

9. Master control system as defined in claim 1, wherein said geographical region comprises a county.

10. Master control system as defined in claim 1, wherein said control signals are coded, and said receiver includes decoder means for decoding said control signals for generating said disabling signals.

11. Master control system as defined in claim 10, wherein said decoder means includes microprocessor means for generating said disabling signals when a predetermined coded signal is applied to said microprocessor means; and a decoder for converting said control signals into said predetermined coded signals.

12. Master control system as defined in claim 11, wherein said microprocessor means includes storage means for storing information identifying each sprinkler system, whereby said microprocessor means can relate a transmitted identifying indicia to a given or specified sprinkler system.

13. Master control system as defined in claim 12, wherein said storage means comprises ROM.

14. Master control system as defined in claim 1, wherein each said valve is provided with electrical input leads, each valve opening to allow the flow of water only when a voltage is applied to leads; a source of voltage; said receiver means including an electronic switch in series connection between said source of voltage and said leads.

15. Master control system as defined in claim 14, wherein said source of voltage comprises a timer controller for applying a voltage to an associated valve comprises a timer controller.

16. Master control system as defined in claim 1, wherein said transmitting station comprises a radio transmitter having an input and output; a transmitting antenna connected to said transmitter output; and a computer having an output data line connected to said transmitter input, said computer being programmed to output data to said transmitter corresponding to the desired control signals containing said identifying indicia.

17. Master control system as defined in claim 16, wherein said computer is programmed to generate control signals containing identifying indicia unique to a predetermined geographical region that are only effective within a corresponding geographical region, only receivers within said predetermined region being capable of converting said control signals to disabling signals within said predetermined region.

18. A grid of master control systems for conserving water used by sprinkler systems within predetermined substantially adjoining geographical regions, each master control system comprising a plurality of sprinkler systems, each of which is assigned an identifying indicia; a transmitting station arranged for transmitting control signals receivable at any location within said geographical regional; a valve connecting each sprinkler system to a water source for selectively feeding water to an associate sprinkler system when said valve is open and for precluding water from being fed to said associated sprinkler system when said valve is closed; a receiver for each sprinkler system within said region connected to an associated valve for receiving said control signals and generating a disabling signal for causing only said valves for said sprinkler systems assigned said identifying indicia to open independently of their status, whereby said transmitting station can control and override the operation of selected sprinkler systems assigned said identifying indicia to regulate the extent to which water may be used within said geographical region in accordance with protocols established for the consumption of water by said sprinkler systems within said geographical region.

19. A grid of master control systems as defined in claim 18, wherein said geographical regions adjoin each other, control signals transmitted by a transmitting station in one region being received by receivers in other adjoining regions, each receiver including decoding means for recognizing only control signals transmitted by a transmitting station within the same region, whereby each transmitting station is only effective for controlling sprinkler systems within its own region.

20. A grid of master control systems as defined in claim 18 comprising a master transmitting station for transmitting control signals receivable within a plurality of regions, said transmitting station being arranged to transmit unique control signals for each region, whereby control signals effective when received within one region are ineffective when received within another region.

* * * * *